(12) United States Patent
Sommer et al.

(10) Patent No.: US 8,216,737 B2
(45) Date of Patent: Jul. 10, 2012

(54) END PLATE FOR A FUEL CELL STACK

(75) Inventors: Stefan Sommer, Ulm (DE); Christian Schleier, Guenzburg (DE)

(73) Assignee: Reinz-Dichtungs GmbH, Neu-Ulm (DE)

( * ) Notice: Subject to any disclaimer, the term of this patent is extended or adjusted under 35 U.S.C. 154(b) by 874 days.

(21) Appl. No.: 11/664,639

(22) PCT Filed: Oct. 6, 2005

(86) PCT No.: PCT/EP2005/010898
§ 371 (c)(1),
(2), (4) Date: Oct. 1, 2007

(87) PCT Pub. No.: WO2006/037661
PCT Pub. Date: Apr. 13, 2006

(65) Prior Publication Data
US 2008/0057372 A1 Mar. 6, 2008

(30) Foreign Application Priority Data
Oct. 6, 2004 (DE) .......................... 10 2004 049 623

(51) Int. Cl.
*H01M 2/38* (2006.01)

(52) U.S. Cl. ........ 429/456; 429/408; 429/443; 429/459; 429/512

(58) Field of Classification Search .................. 429/407, 429/408, 428, 443, 544, 456, 457, 459, 512, 429/412, 444
See application file for complete search history.

(56) References Cited

U.S. PATENT DOCUMENTS

| 5,486,428 | A | * | 1/1996 | Gardner et al. | 429/410 |
| 2003/0157390 | A1 | * | 8/2003 | Keefer et al. | 429/34 |
| 2004/0142227 | A1 | | 7/2004 | Sugai et al. | |
| 2004/0146772 | A1 | * | 7/2004 | Miyao et al. | 429/38 |
| 2004/0247984 | A1 | | 12/2004 | Ismaler et al. | |
| 2005/0282060 | A1 | * | 12/2005 | DeFillippis et al. | 429/38 |

FOREIGN PATENT DOCUMENTS

| DE | 695 03 167 T | 10/1998 |
| DE | 102 34 821 A1 | 2/2004 |
| DE | 103 55 191 A1 | 3/2005 |
| EP | 0 673 074 B1 | 7/1998 |
| JP | 2001 143734 A | 5/2001 |
| WO | WO 03/030291 A2 | 4/2003 |

* cited by examiner

*Primary Examiner* — Patrick Ryan
*Assistant Examiner* — Ben Lewis
(74) *Attorney, Agent, or Firm* — Marshall & Melhorn LLC

(57) ABSTRACT

The present invention relates to an end plate for a fuel cell stack, containing at least one channel (7) for the supply and/or removal of at least one reactant and/or a reaction product and/or a coolant, wherein at least a part at least of one pump (8) for delivering the reactants and/or reaction products and/or coolant and which is arranged in the course of the respective channel (7) is integrated into the end plate. The invention further relates to a fuel cell stack which contains such an end-plate.

16 Claims, 3 Drawing Sheets partially opened     closed

END PLATE FOR A FUEL CELL STACK

BACKGROUND OF THE INVENTION

The invention relates to an end plate for a fuel cell stack, according to the preamble of the main claim, as well as to a fuel cell stack which contains at least one such end plate.

Usually end plates assume the function of holding together a fuel cell stack which comprises several fuel cells connected in series, for example by way of clamping with a second end plate, as well as for collecting current at a first or last fuel cell of the respective fuel cell stack. According to the state of the art, it is furthermore known to lay channels for the supply and/or removal of reactants, reaction products and/or coolants through an end plate, so that the respective end plate contains a section at least of one such channel. Typically, with an end plate according to the state of the art, such channels are arranged in an end region of the end plate, in order from there to accordingly lead into edge regions of the adjacent fuel cells.

Typically, pumps are required for the operation of fuel cell stacks, which in each case may serve for conveying a reactant, a reaction product or a coolant. At the same time, with conventional fuel cell stacks, the pumps form auxiliary units which are arranged separately from the actual fuel cell stack. This demands an expensive tube/piping system which is disadvantageously costly, and simultaneously leads to relatively long transport paths, which in turn leads to undesired, uncontrollable flow dynamics with disadvantageously high energy losses.

SUMMARY OF THE INVENTION

It is then the object of the present invention to overcome the mentioned disadvantages and simultaneously to permit a construction of fuel cell systems which is more compact compared to the state of the art.

According to the invention, this object is achieved by an end plate with the characterising features of the main claim in combination with the features of the preamble of the main claim, and by way of a fuel cell stack with the features of claim 19, as well as a method according to claim 20. Advantageous further developments of the invention are to be deduced by the features of the dependent claims.

By way of the fact that with such an end plate which contains at least one channel for the supply and/or removal of at least one reactant and/or a reaction product and/or a coolant, at least one part of at least one pump arranged in a course of the respective channel for conveying the reactants and/or reaction products and/or coolant, is integrated into the end plate, then with the use of this end plate one may realise a fuel cell system which as a whole has an extremely compact construction. Further advantages result by way of being able to realise extremely short transport paths for a medium delivered by the respective pump, between the pump and the location of application of the respective medium by way of this. With regard to the mentioned application location, it may be the case of a reaction space of a fuel cell or of a coolant layer of a bipolar plate of a respective fuel cell stack. Thereby, the type of fuel cell considered is of no significance. With typical arrangements, hydrogen and oxygen or air are used as reactants, and/or water as a coolant.

A part of a pump is to be deemed as being integrated into the end plate when it takes its place within the external dimensions of the end plate, preferably within a convex envelope of a base body of the end plate. With this, the convex envelope is defined as the smallest convex quantity which contains the mentioned base body, wherein the pump or parts of the pump, inasmuch as they are not incorporated into the base body as one piece, are not themselves considered as being a constituent of the base body. The base body itself is preferably plate-like.

With regard to a construction manner which is as compact as possible, it is particularly advantageous if the respective pump is completely integrated into the end plate within this context, or with the exception of a drive motor or a part of a drive motor of the pump.

In this manner, one may arrange a pump for the supply of a reactant, typically a reactant gas such as hydrogen for example, as well as a pump for conveying a coolant such as water for example or for transporting away a reaction product, e.g. in the form of water vapour. It is also possible to arrange two or more pumps in the described manner completely or partly integrated into the end plate.

A fuel cell stack which contains at least one end plate of the described type has been shown to be advantageous. A fuel cell stack may also be provided with two such end plates in an advantageous manner, wherein for example one pump for a reactant may be integrated into a first end plate and a pump for a coolant into the second end plate of the fuel cell stack. Of course any other combination of arrangements of two or more pumps in two end plates of a fuel cell stack is possible.

An integration of pumps of the described type, which are designed as peripheral assemblies with conventional fuel cell systems, into the end plate or into the end plates permits a very compact construction manner of the fuel cell system. Connection elements such as fittings, pipes and/or flexible tubes may be largely done away with. This leads to a reduced variant of parts and to a minimisation of connection locations which in turn renders the fuel cell system less prone to failures. Extremely short transport paths result on account of the integration, wherein particularly with a suitable design of a coolant pump it is also possible to realise relatively small fluid volumes. Heat losses may also be kept low by way of this, which has a positive effect of the thermal economics of the fuel cell. Thereby one is to take into account the fact that although heat needs to be transported away in larger quantities on operation of the fuel cell, a discharge of heat should however be advantageously effected only in a controlled manner and therefore should be effected where possible only or mainly via a coolant, whilst a thermal loss only due to long transport paths may render a controlled temperature control of a fuel cell more difficult, which is undesirable. Good and easily controllable flow dynamics and thus good control ability or regulating ability of system parameters such as temperature and humidity result on account of the short transport paths and small fluid volumes. Finally, a material saving may also result due to the integration of at least one pump into the end plate.

The at least one channel contained in the end plate may usefully be incorporated into the end plate such that it is formed by recesses in the end plate. End plates of the described type which are relatively effortless to manufacture and therefore particularly advantageous, may comprise a base body formed of an insulator, for which a manufacture with the injection moulding method lends itself. This base body is preferably to be manufactured of plastic. For injection moulding manufacture, one may particularly use filled and/or fibre-reinforced or unfilled thermoplastic plastics such as PA (polyamide), PI (polyimide), PTFE (polytetrafluorethylene), PET (polyethylene terephthalate), PC (polycarbonate) PEEK (polyetheretherketone), PPS (polyphenylene sulphide), LCP (liquid crystal polymers), POM (polyoxymethylene), PPO (polypropylene oxide).

One advantageous simple construction results with a single-piece design of the base body. One may however also envisage the mentioned base body being joined together of two or more than two parts, which for example may in turn be designed in a plate-like manner. A multi-part design of the base body may lend itself, depending on the geometry of the channel integrated into the end plate or the channels integrated into the end plates, and depending on the arrangement and shape of recesses provided for the pump or pumps, in order to permit its inexpensive manufacture with an injection moulding method. In this case, the parts forming the base body should be mutually sealed in order to prevent an undesirable exit of reactants, reaction products or a coolant. For this, the parts may be bonded, welded and/or mutually braced to one another. One may also envisage arranging one seal or several seals between the individual parts for the same purpose.

For producing only a low number of units, a material-removing manufacture of the base body or parts of the base body may be more meaningful for reasons of cost. One may then also apply fibre-reinforced layer press materials with binders of epoxy resins, silicone resins, phenol resins or melamine resins. A manufacture of the base body or parts of the base body amid the use of duroplastic, fibre-reinforced plastics based on e.g. PF-phenol resin, MF-melamine resin or UP-unsaturated polyesters is also conceivable.

With typical embodiments of the invention, the pump which is completely or partly integrated into the end plate is designed as a rotatory pump which permits a uniform transport of the medium concerned (reactants, reaction products or coolant) and a good controllability of the transport. With this, a ventilator, for example a suitable fan serving for conveying a gaseous medium is to be indicated as a rotatory pump. Other types of pumps too may be integrated into the end plate in the described manner. With regard to the pump, it may for example be the case of a jet pump. An arrangement of several pumps or parts of several pumps of a different type in the end plate is also possible.

One may design the pump in an advantageous manner such that it comprises a first connection for the supply of fresh reactant gas to the pump, a suction connection for re-supplying reactant gas coming from a reaction space, thus which has already been supplied once to a fuel cell, and a further connection as a common exit for the fresh and the re-supplied reactant gas, wherein the mentioned common exit with a directed use of the end plate in a fuel cell stack again leads to the reaction space of one or more fuel cells. With such a design of the pump, one may not only drive a flow of reactants, but also (additionally or instead of this), by way of the re-supply of reactant gas which has already flowed through the reaction space which is given by a channel system, one ensures a uniformly humid climate in the reaction space. This is related to the fact that a reactant as which has already flowed through the reaction space is usually enriched with diffused water. The described effect is of great advantage since an undesirable drop in the humidity between the supply and removal in the reaction space of a fuel cell may thus be avoided. At the same time one should take into account the fact that a humid climate is desired in the reaction space, in order to prevent a drying-out in particular of an electrolyte membrane of a fuel cell. One in turn is forced to rely on a humidity which is as uniform as possible since a climate having a water content which is too high may in turn act in a reaction-inhibiting manner in a reaction space.

It is conceivable with a pump of the described type with three connections, of which one forms a suction connection for re-supply of already used reactant gas, for the mentioned first connection for the supply of fresh reactant gas to also be designed as a suction connection. With regard to a construction which is as simple as possible, it is however advantageous if the pump is designed as a passive component with which a vacuum at the suction connection for the re-supply of the used reactant gas is caused by a flow of the fresh reactant gas from the first connection to the further connection serving as a common exit. This may be achieved in a particularly simple manner by way of the design of the pump as a Venturi nozzle, wherein the suction connection for the re-supply is advantageously to be arranged in a region of minimal flow cross section. Moving parts may thus be advantageously done away with. Other types of jet pumps may be used in a similar manner as a passive component for recirculating reactant gas.

Pumps of the type described in the previous paragraphs may then be used in a useful manner in combination with fuel cell systems also when they are not integrated into an end plate. Thus for example it would be conceivable to apply such a pump onto an end plate or to design it as an externally arranged peripheral apparatus for a fuel cell stack or another fuel cell system.

A further development of the invention, additionally to the at least one pump also envisages integrating at least one valve at least partly, preferably completely into the end plate, with which a flow of reactant, reaction product or coolant is controlled, regulated and/or blocked when required. Such valves could be powered and/or may be slide damper, rotary slide valves, magnetic valves, throttle flaps or the like. Such a valve in the simplest case may serve as a safety valve in order to prevent a discharge of medium, for example given an interruption of operation of the respective fuel cell system. If such a valve, whose integration into the end plate serves for an advantageously compact construction and leads to an arrangement of the valve in close proximity with regard to the fuel cells, is designed such that a flow of a reactant, reaction product or coolant may be continuously controlled and/or regulated with the help of the valve, then there results the possibility of advantageously controlling a fuel cell temperature and/or an optimal power exploitation. At the same time, the valve may be controlled with respect to events or also with respect to time. The valve too, may be designed as a flush valve for the occasional blowing-free of a channel system or reaction space, wherein a blowing-out, for example by way of a brief increase in the reactant flow may again be effected in a time-controlled manner, thus in defined time intervals, or in an event-controlled manner, for example when a water constituent in a reaction space or in a reaction gas exiting from the reaction space which is too high is determined.

Typically, the end plate on an active surface which in the assembled condition bears on a first fuel cell of a fuel cell stack would have a current collector. This is preferably designed in a two-dimensional manner, for example as a metal plate or sheet-metal piece, in order to permit the supply of current with as low as possible resistance losses. In particular, if the end plate comprises a base body formed of an insulator, the current collector is preferably to be designed as separate component which may be applied onto the base body on the mentioned surface or here may be applied into the base body.

One may envisage the base body of the end plate comprising hollows open towards the current collector, which possibly may only be separated by way of individual webs on which the current collector may bear. In this context, all bodies which are closed on the rear side and comprise peripheral side walls as well as at least one intermediate wall are to be understood as being provided with open hollows. An undesired loss of heat at a first fuel cell bearing on the end plate may be well prevented by way of this. Thus by way of this, fuel cells lying on the outside may be thermally insulated particularly, by which means a uniform temperature control of a complete fuel cell stack is rendered possible. Furthermore, one may achieve a high stiffness of the end plate in this manner. In order to fulfil their purpose, the mentioned hollows may advantageously be designed with a depth (thus a dimension perpendicular to a current collector plane) of between 0.5 and 50 mm. With particularly preferred embodiments of the invention, the hollows form a honeycomb structure which is open towards the adjacent fuel cell stack and which is covered only by the current collector, for example a sheet metal piece. The honeycomb structure offers advantages with regard to the stiffness of the plate and the support of the current collector. Furthermore, the air cushion arising in the honeycombs acts as a thermal insulation. As with other designs of the mentioned hollows, a more uniform temperature level sets in over all cells on account of this. This contributes to an improved regulating ability or controlling ability of the fuel cell stack, by way of which one obtains a higher performance. The at least one pump integrated into the end plate is usefully to be arranged in a region of one side of the end plate which is distant to the current collector. The construction height of one of the units or of the unit integrated into the end plate in such a manner may also be used in order to design the end plate thicker and thus stiffer, without increasing the construction volume for the complete system.

The present invention is generally suitable for many pump types. It has particular advantages for mechanical pumps which for example comprise a drive shaft. Thus a pump may comprise a drive shaft which is mounted on one or two sides, i.e. has one or two bearings. Here, one embodiment envisages a fan wheel or the pump/pump impeller being arranged between both bearings. This is particularly advantageous mechanically. Also the fact that at least one mounting is arranged within the end plate base body is also advantageous, and the accommodation of both mountings in the end plate base body is also possible. It is advantageous that the drive shaft is arranged essentially perpendicular to the end plate, i.e. in the stack direction of the fuel cell stack. However an arrangement which deviates from this with regard to the angle is of course also possible.

Various power/output values are possible for the pump. For fuel cell systems of smaller than 1,000 W, volume flows of the fluid to be delivered of 0.01-0.5 l/s at 0.01 to 1 bar are advantageous.

For a corresponding fan with a system power of smaller than 1,000 W, the volume flow is advantageously 100-2,000 l/min, preferably 250 l/min to 500 (at maximal 800 Pa).

The above mentioned mechanical pump may for example advantageously be a rotatory pump. Here there results the advantage that no uncontrolled pressure increase occurs given a blockage of this pump.

According to the invention, the end-plate assumes the function of the pump housing. A reduction in the number of parts is given on account of this, and also the risk of the selection of components which are not compatible with the media is minimised. The end plate and the pump form a functional unit and for this reason this pump without the end plate is as a rule no longer capable of functioning. The material of the pump (of the pump impeller) as well as of the end plate may preferably be the same, but however may also be different. The pump may, as specified above be mounted on one or both sides. The bearings here may also be contacted by the media, by which means a simultaneous lubrication arises, which may increase the life duration. An increased running smoothness is achieved with a mounting on both sides, and thus a significantly higher life duration. Those advantages which have just been mentioned for a "pump" are of course analogous with regard to a fan. The possibility of mounting the shaft on both sides is absolutely decisive here, since the fan in a compact constructional shape, as with the present field of application, must run at very high rotational speeds (up to approx. 16,000 rev/min).

Further advantageous formations of the present invention are described in the remaining claims.

BRIEF DESCRIPTION OF THE DRAWINGS

Embodiments of the invention are hereinafter explained by way of the FIGS. 1 to 6. There are shown in.

DESCRIPTION OF THE PREFERRED EMBODIMENTS

Figure 1:
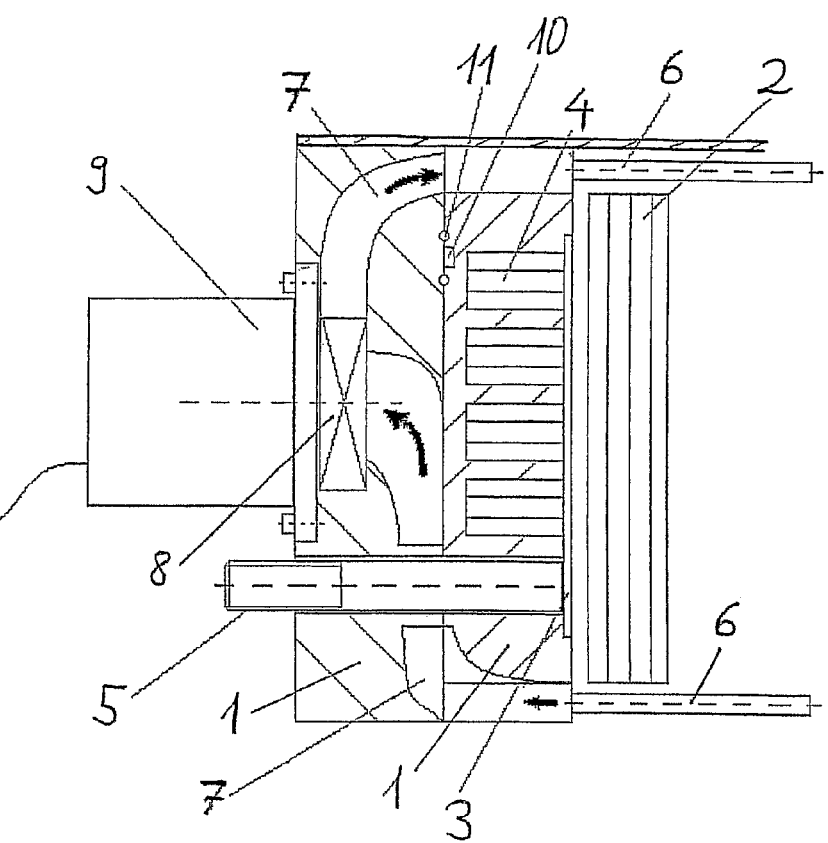
FIG. 1 a cross section through an end plate according to the invention, and a part of a fuel cell stack limited by this end plate, FIG. 2 a second end plate of the same fuel cell stack, likewise designed according to the invention, in a corresponding representation.

The end plate illustrated in FIG. 1 comprises a base body 1 which is joined together of two parts which are each plate-like and manufactured of polyamide (other thermoplastic plastics could also be used to the same extent) and bonded to one another. Alternatively, the two parts of the base body 1 may also be welded to one another or merely mutually braced. Finally, it would also be conceivable to design the base body 1 as one piece.

Fuel cells of a corresponding fuel cell stack which are stacked onto one another and are separated from one another by bipolar plates 2 connect to one side of the illustrated end plate, which is on the right in FIG. 1. The end plate itself on the mentioned side comprises a two-dimensional current collector 3 which is formed by a sheet-metal piece admitted there into the base body 1, and defines an active surface of the end plate. The part of the base body 1 bearing on the current collector 3 is provided with a honeycomb structure 4 which is open towards the current collector 3 and consists of individual honeycombs which are separated from one another by webs, or hollows open towards the current collector 3, which in turn have a depth of about 30 mm (other shaping and dimensioning of the hollows with depths of between 0.5 mm and 50 mm could also be considered). The metallic current collector (e.g. of nickel-(201), copper- or iron metal or an alloy of the mentioned metals, may also e.g. have a coating of gold), on the rear side, is connected to a metallic current collector 5 which is led to the outside through the end plate in the Z-direction (of the stack, thus perpendicular to a plane defined by the end plate). The metallic current collector 5 (e.g. of nickel-(201), copper- or iron metal or an alloy of the mentioned metals, may also e.g. have a gold coating) is preferably—as in the present case—designed as a bolt and connected to the current collector 3 preferably by way of welding. By way of this one may attach the current collector 5 at a position in the x-y plane of the cell stack which is advantageous for the design. This entails the advantage that one may do away with a lateral current down-conductor which would break through a sealing ring surrounding the current collector 3 and would thus render a sealing of the end plate towards a first fuel cell bearing on the end plate more difficult. The represented end plate is braced to a second end plate which is not shown here, with the help of bracing screws 6, by which means the complete fuel cell stack is held together.

The illustrated end plate contains a channel 7 incorporated into the base body 1 for the supply of air serving as a reactant gas to the fuel cell. A pump 8, here designed as a rotary pump, is arranged in the course of this channel 7 and with the exception of a drive motor 9 which is seated directly on the end plate is completely integrated into the end plate and is seated in a recess in a part of the base body 1. The channel 7, as other recesses in the base body 1, is realised by way of a suitable shaping of a casting mould used on manufacture of the mentioned part of the base body 1. Alternatively a manufacture of the recesses in a material-removing manner would also be conceivable, wherein the base body 1 could then be manufactured of a fibre-reinforced layer press material, for example with a binder of epoxy resin.

A channel 7 and a pump 8 for a further reactant gas may also be provided in the same manner, possibly also using other pump types. Furthermore, it would be possible to also arrange the drive motor 9 integrated into the end plate, and achieve an even more compact construction manner on account of this.

Finally in FIG. 1, one may also recognise a cross section of a reactant gas channel 10 which is integrated into the end plate and which is arranged on a border surface between the two parts of the base body 1, as well as two parts of a seal 11 which mutually seal the mentioned parts to one another and thus also the reactant gas channel 10.

A fan impeller placed in the course of the channel 7 and indicated in FIG. 1 is to be noted as being the main component of the pump 8, and this impeller is integrated within a convex envelop of the base body 1 which defines an outer bordering of the end plate, and is thus integrated into the end plate.

Figure 2:
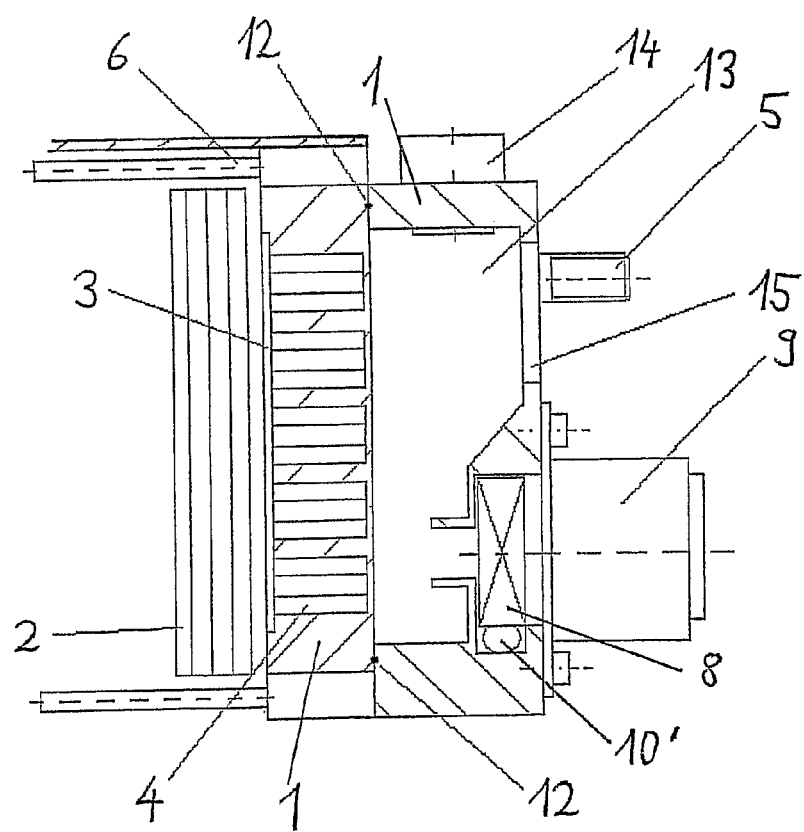

A second end plate is shown in FIG. 2, which delimits the same fuel cell stack. This end plate also comprises a base body 1 which is composed of two parts, wherein these parts are mutually sealed by way of an annular seal 12 of an elastomer. Other recurring features which have already been explained by way of FIG. 1 are again provided with the same reference numerals.

With the end plate represented in FIG. 2, a part of a pump 8 is also integrated into the end plate, wherein only the drive motor 9 of this pump 8 is arranged outside the end plate. The pump 8 is again designed as a rotary pump and here is arranged in a course of a coolant channel 10'. This coolant channel 10' is incorporated into the base body 1 of the end plate and leads to the bipolar plates 2 of the adjacent fuel cells. In the present case, water is provided as a coolant, which after flowing through the bipolar plates 2 is led to a cooler and from this cooler flows into a compensation container 13 integrated into the end plate 12, wherein this container is in connection with a connection of the pump 8 on the suction side. Finally, one may also recognise a lid 14 which closes an opening after refilling the water serving as a coolant, as well as an examination glass 15 for checking the coolant level.

It is of course possible to design end plates by way of a combination of the features shown in FIGS. 1 and 2 such that several pumps 8 at least partly are integrated in a single end plate, wherein these pumps in each case serve for conveying a reactant, a reaction product or a coolant.

Figure 3:
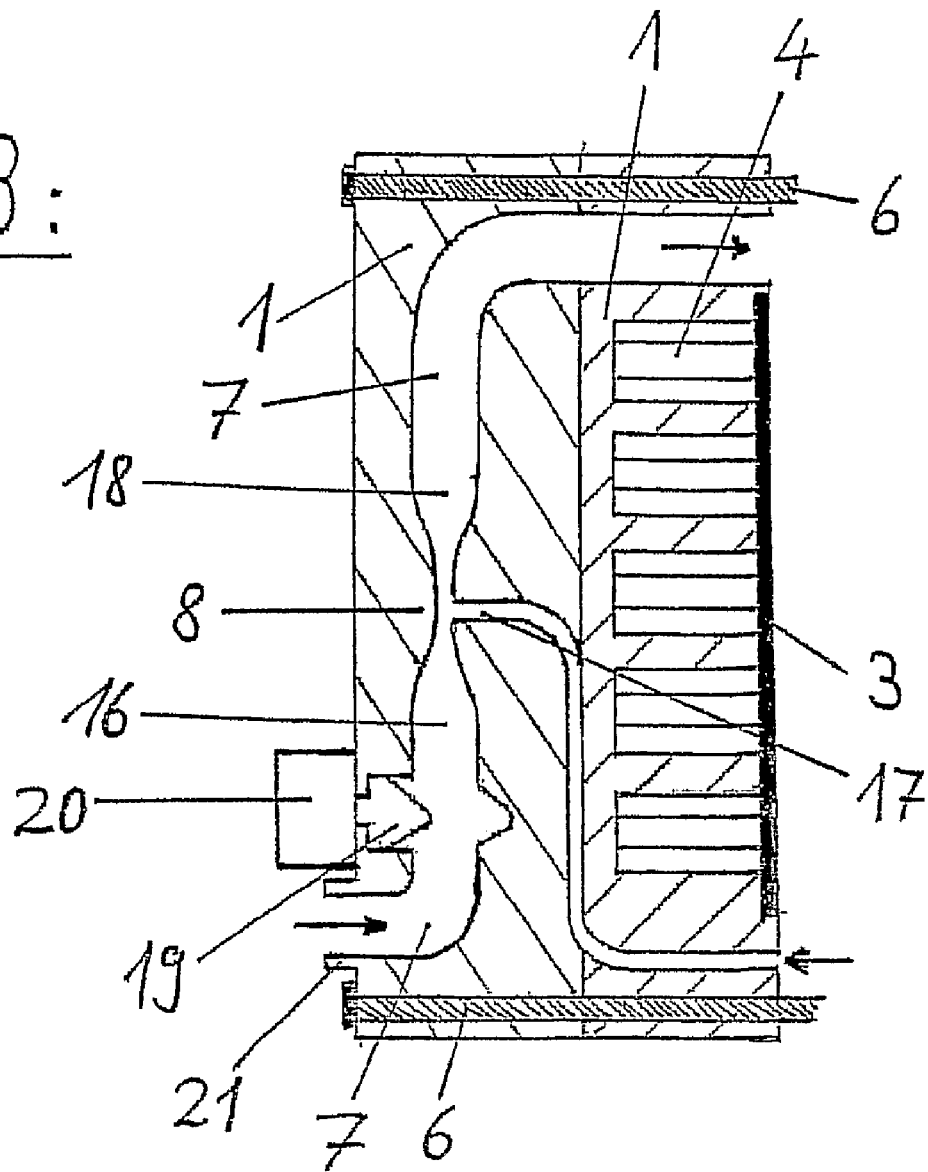
FIG. 3 a cross section through an end plate in another embodiment of the invention.

Another end plate—likewise an embodiment example of the present invention, is represented in FIG. 3 as a cross section. There, recurring features are again provided with the same reference numerals and to some part are no longer explained in detail. The end plate represented in FIG. 3 contains a channel 7 for leading hydrogen serving as a reactant gas. Arrows indicate a flow direction as already in FIG. 1. In this end plate too a pump 8 is arranged in the course of the channel 7 and this pump is completely integrated into a part of the base body 1 of the end plate. The pump 8 in the present case is designed in the form of a Venturi nozzle as a passive component and comprises a first connection 16 for the supply of fresh hydrogen, a suction connection 17 for the re-supply of hydrogen coming from reaction spaces of adjacent fuel cells, thus hydrogen which has already once been led to the fuel cells, and a further connection 18 as a common exit for the fresh and re-supplied hydrogen. With the end plate illustrated in FIG. 3, the pump 8 serves for suctioning out the reactant gas from the reaction spaces of the adjacent fuel cells and for the re-supply of a part of this reactant gas (hydrogen here) into the channel 7 leading to the fuel cells. With this, one achieves a recirculation, wherein the re-supplied reactant gas is typically enriched with diffused water, so that a uniformly humid climate is produced in the respective reaction spaces of the fuel cells on account of the recirculation. The pump 8 in the present case has no moving parts, wherein a pump effect arises due to the fact that the suction connection 17 is arranged at a location of minimal flow cross section of the Venturi nozzle forming the pump 8. Other types of pumps and in particular jet pumps could be applied in the described manner and for this, be integrated into the end plate.

FIG. 3 also shows a valve 19 which is integrated into the end plate and may be controlled by way of a drive 20 which is applied onto the end plate at the rear side. A reactant flow prevailing in the channel 7 may be controlled or regulated with this valve 19. Additionally the valve may serve as a safety valve for completely blocking a supply of hydrogen. It is also possible to apply the valve 19 or another valve integrated into the end plate in a similar manner as a flush valve which when required (controlled with respect to events or to time) may be opened for blowing out a fuel cell stack limited by the end plate. Finally, in FIG. 3 one may also recognise a connection piece 21 integrally formed as one piece on a part of the base body 1 of the illustrated end plate, for the connection of the end plate to a hydrogen supply.

Figure 4:
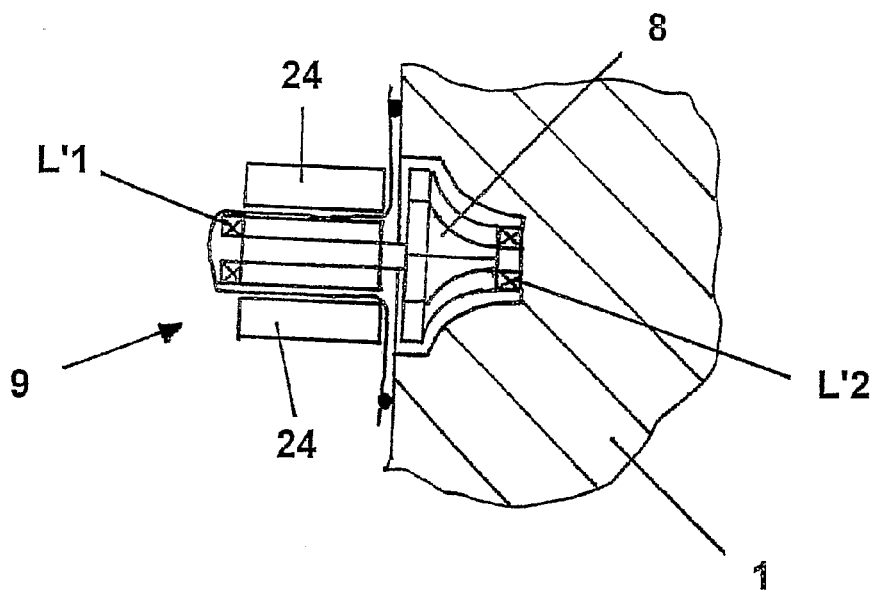
FIG. 4 as a sketch, a cross section through a further embodiment of a pump mounted on both sides, wherein a special seal is provided and FIG. 5 a detailed sketch for bleeding the pump housing as well as FIG. 6 two opening conditions of a valve which is designed as a rotary slide valve.

FIG. 4 shows a detail for sealing off the drive motor 9. The magnet coupling here is directly attached in the air gap of the motor and for this reason there is only one sealing location, and no axial face seal is required. The bearings L1' and L2' are both within the sealed region. Here only the bearing location L2' is accommodated within the end plate base body 1. FIG. 4 shows how the two coils 24 lie outside the sealed region. The sealing is effected at the outer end-face of the end late base body 1. In this manner the removal of the pump 8 is particularly simple.

Figure 5:
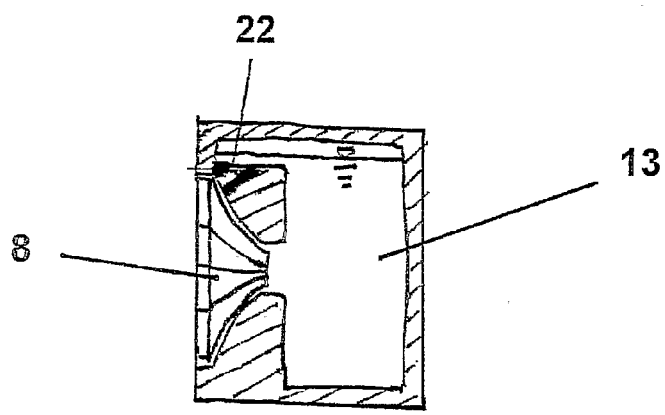

FIG. 5 shows a positioning of the pump in a manner such that a targeted bleeding of the pump housing may be achieved. The cooling water compensation container 13 may be particularly well seen in cross section. Furthermore a bleeding bore 22 from the pump space (thus the cavity which is adapted to the pump 8 and essentially is formed following its course) to the compensation container 13 is to be seen.

Figure 6:
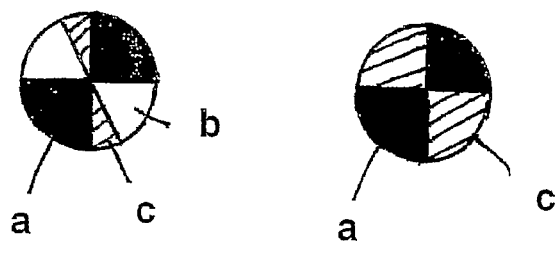

FIG. 6 shows the possibility of the design of a valve which is designed as a rotary slide valve and act like a throttle flap. A stationary housing (a) with a defined opening (b) is provided. An air flow may be opened/closed in a defined manner by way of a rotary slide (c). The flap is opened with a high humidity (moisture content) and simultaneously the humidity and the air quantity are regulated ([closed-loop] controlled). The throttle flap here is likewise integrated into the end plate.

The invention claimed is:

1. An end plate for a fuel cell stack, comprising: at least one channel for the supply and/or removal of at least one reactant and/or a reaction product and/or a coolant, wherein at least one part at least of one mechanical pump for delivering the reactant and/or reaction product and/or coolant, which is arranged in the course of the respective channel, is integrated into the end plate and defines a closing outer bordering of both said end plate and said channel, wherein the pump is designed as a rotatory pump.

2. The end plate according to claim 1, wherein the pump, completely, or with the exception of a drive motor or a part of the drive motor, is completely integrated into the end plate.

3. The end plate according to claim 1, wherein the pump comprises a first connection for the supply of fresh reactant gas, a suction connection for the resupply of a reactant gas coming from a reaction space, and a further connection as a common exit for the fresh and resupplied reactant gas.

4. The end plate according to claim 1, wherein at least one valve for controlling and/or regulating and/or blocking a flow of reactant, reaction product or coolant, is integrated into the end plate.

5. The end plate according to claim 1, further comprising a base body formed of an insulator.

6. The end plate according to claim 5, wherein the base body is manufactured of exactly one part.

7. The end plate according to claim 5, wherein the base body is joined together of at least two parts.

8. The end plate according to claim 7, wherein the mentioned parts of the base body are mutually sealed.

9. The end plate according to claim 5, further comprising a current collector on an active surface.

10. The end plate according to claim 9, wherein the base body comprises hollows which are open towards the current collector.

11. The end plate according to claim 10, wherein the hollows form a honeycomb structure.

12. The end plate according to claim 5, wherein the pump comprises a drive shaft which is mounted on one side or two sides.

13. The end plate according to claim 12, wherein the drive shaft is mounted on two sides, wherein a fan wheel or a pump is arranged between bearings.

14. The end plate according to claim 13, wherein at least one bearing is arranged within the base body.

15. The end plate according to claim 12, wherein the drive shaft is arranged essentially perpendicularly to the end plate.

16. A method for manufacturing an end plate, comprising:
a) providing a base body or at least a part of a base body, by way of a suitable shaping of a casting mould used for manufacture of the base body or part of the base body; and
b) providing at least one recess for a channel integrated into the end plate and/or for a rotatory pump integrated at least partially into the end plate, said rotatory pump defining a closing outer bordering of both said end plate and said channel.

* * * * *